June 4, 1957 I. W. DONNER 2,794,554
FLOWER POT STAND
Filed July 9, 1954
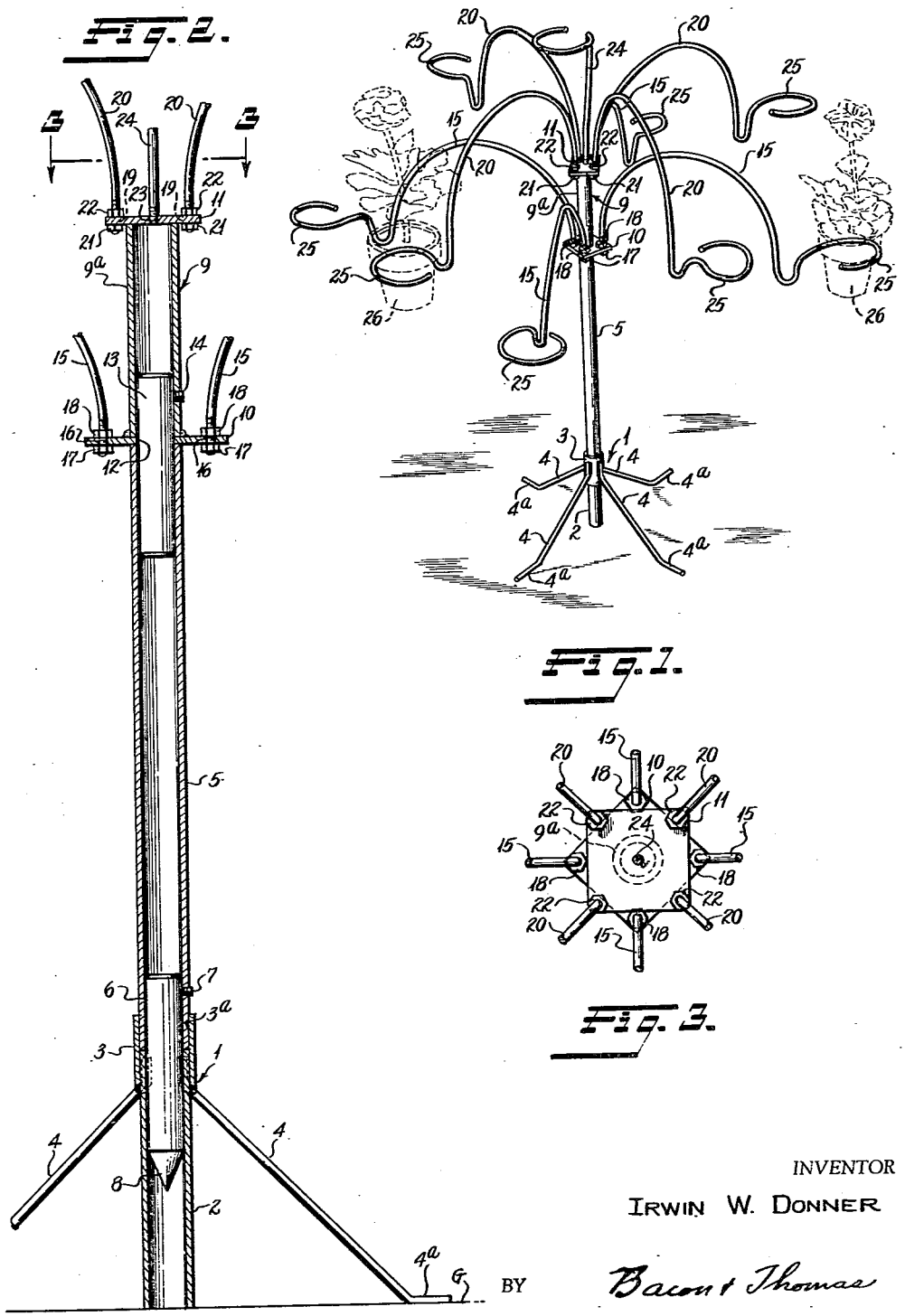
INVENTOR
IRWIN W. DONNER
BY Bacon & Thomas
ATTORNEYS

United States Patent Office 2,794,554
Patented June 4, 1957

2,794,554

FLOWER POT STAND

Irvin W. Donner, Dubuque, Iowa

Application July 9, 1954, Serial No. 442,360

1 Claim. (Cl. 211—71)

The present invention relates in general to a display stand, and, more particularly, to a metallic stand for supporting a plurality of potted plants.

One of the features of the present construction is that the parts thereof can be readily assembled by unskilled persons, thus making it feasible for the stand to be shipped in a knocked down condition.

A further feature of the instant construction is that it embodies an assembly for supporting a plurality of flower pots, which assembly may be supported in any one of several ways, either indoors or outdoors.

Another feature of the invention is that the assembly is adapted to be mounted so that it can rotate freely with respect to its supporting means.

A further feature of the invention resides in the provision of individual flower pot supporting arms that can be adjusted relatively to each other to enable the stand to be positioned against a wall or in a corner.

The principal object of the invention is to provide a holder for potted plants which is not only practical but is also attractive and ornamental in appearance.

Another object is to provide a flower pot stand suitable for either indoor or outdoor use.

A further object is to provide a flower pot stand wherein the elements for supporting the flower pots are individually adjustable so that an infinite variety of decorative effects may be attained through the use thereof.

Still another object is to provide a flower pot stand which is simple in construction, light in weight, durable in use, and which can be made from readily assembled prefabricated parts.

A still further object is to provide a flower pot stand that can be readily assembled and disassembled for shipping or storage purposes.

Other objects and features of the invention will be apparent from the following description taken in conjunction with the accompanying drawings, in which:

Fig. 1 is a perspective view of a flower pot and stand constructed in accordance with the principles of the present invention and wherein two potted plants are shown in dot and dash lines;

Fig. 2 is a fragmentary longitudinal sectional view taken through the center of the stand; and Fig. 3 is a horizontal sectional view taken along the lines 3—3 of Fig. 2, looking in the direction of the arrows.

Referring now to the drawings, the stand comprises a base, generally indicated by the numeral 1. The base 1 consists of a tubular member 2 having a sleeve 3 surrounding the upper end thereof. A plurality of legs 4 maintain the tubular member 2 in a normally vertical position, preferably with the lower end of said tubular member resting upon the ground. The legs 4 may be welded, bolted or otherwise suitably attached at spaced points to the outer periphery of the sleeve 3, and are bent below their points of attachment to extend downwardly and outwardly toward the ground. The legs 4 are also bent at their lower extremities to form feet 4a which lie in a common horizontal plane parallel with the floor or ground G.

The sleeve 3, which may be attached to tubular member 2 by soldering, welding or any other suitable means, extends above the upper extremity of said tubular member 2 to form a socket 3a. One end of a tubular column 5 is adapted to be telescopically received in the socket 3a in abutting contact with the upper extremity of tubular member 2. A cylindrical guide or stake member 6 is rigidly held in the lower end of column 5 by a set-screw 7, as shown in Fig. 2, or by any other suitable means such as welding, or force-fitting. The guide member 6 extends beyond the lower end of column 5 and is adapted to be telescopically received in the tubular member 2 when column 5 is mounted in socket 3a. Thus, it will be seen that a sturdy connection is formed which permits column 5 to be removably and rotatably mounted on the base 1.

The guide member 6 is preferably provided with a tapered lower end forming a point 8 adapted to be forced into the ground G in order to support the column 5 outdoors without using the base 1, as will be readily understood.

An assembly, generally indicated by the numeral 9, comprises a tubular spacer member 9a, one end of which is centrally secured to one side of a lower, square plate 10 by welding or other suitable means. The other end of the spacer member 9a is similarly secured to one side of an upper, square plate 11. The two plates, 10 and 11 are disposed with their corners in vertically staggered relation, as best shown in Fig. 3. While the plates 10 and 11 have been illustrated as square, it will be understood that they may have any other suitable configuration.

In order to mount assembly 9 on column 5, the lower plate 10 is provided with a central aperture 12, and an upper guide or pilot member 13 is secured in the lower end of spacer member 9a by a set screw 14 or by any other suitable means such as welding or force-fitting. The guide member 13 extends downwardly through the aperture 12 and beyond the lower square plate 10 and is telescopically received in the upper end of column 5 with plate 11 resting thereon, thereby establishing a sturdy, rotatable and removable connection between the assembly 9 and column 5.

The guide member 13 has a diameter approximately equal to the inside diameter of the column 5 and also the tubular member 2, so that the assembly 9 can be mounted directly upon the base 1, if desired. In such case, the plate 10, of course, will rest upon the upper end of the sleeve 3.

The inner ends of arms 15 are adapted to pass through holes 16 near the corners or points of juncture of the side edges of plate 10. The arms 15 are adjustably secured to the plate 10 by clamping nuts 17 and 18 which are threaded onto said inner ends on opposite sides of said plate. Similarly, plate 11 is provided with holes 19 through which the inner ends of arms 20 pass, said inner ends being adapted to receive clamping nuts 21 and 22 for similar adjustable attachment to square plate 11. The plate 11 is further provided with a centrally located threaded aperture 23 for the reception of the correspondingly threaded lower end of a generally upright arm 24.

The arms 15 and 20 extend through a graceful arch from their points of attachment, as shown in Fig. 1, and are reversely bent at the outer end of the arch and terminate in horizontal loops 25 for receiving and supporting flower pots 26. The loops 25 of the arms 20 are disposed in a common plane vertically spaced from the plane of the loops of the arms 15. The arm 24 is bent so that the loop 25 thereof is concentric with the member 9a. The loops of the several arms are thus arranged in a generally pyramidal fashion.

The stand thus described can be used in three different ways: first, with the assembly 9 mounted upon the column 5, which in turn is mounted on the base 1, as shown in the drawings; secondly, with the pointed guide member 6 inserted directly in the ground and the assembly 9 mounted upon the column 5 (thus eliminating the base 1); and thirdly, with the plate 10 resting directly upon sleeve 3 and with guide member 13 extending into the tubular member 2 (thus eliminating the column 5). It will be noted that in each instance, the assembly 9, including arms 15 and 20, may be revolved bodily with respect to the ground or floor. Moreover, the arms 15 and 20 may be adjusted with respect to each other to secure the desired artistic effect. By adjusting the arms 15 and 20 the stand may be used against a wall, in a corner, etc., with the arms lying in a semi-circle or other suitable sector.

For shipping or storage the column 5 may be dismounted from the base 1, the assembly 9 may be dismounted from the column 5, and the arms 15, 20 and 24 may be disconnected from their respective plates.

It will be understood that various changes may be made in the details of construction and in the arrangement of the elements of the present device without departing from the principles of the invention or the scope of the appended claim.

I claim:

A flower pot holder, comprising: an assembly including an upright tubular spacer member, a square upper plate overlying said spacer member and rigidly secured thereto, a square lower plate underlying said spacer member and rigidly secured thereto, said plates being arranged in vertically staggered relation with the corners of one of said plates being offset 45° about the axis of said spacer member with respect to the corners of the other of said plates and a plurality of arms secured at their inner ends to said plates adjacent said corners and adapted to extend outwardly therefrom in generally radial directions with respect to the centers of said plates, said arms including at their outer ends means for receiving and supporting flower pots, and a pilot member extending through an aperture in said lower plate and being telescopically received within said spacer member and rigidly mounted therein; and a stand for supporting said assembly, said stand including a demountable upright tubular stand member having the same thickness and cross-sectional configuration as said spacer member and disposed in coaxial relation with said spacer member, said stand member underlying said lower plate in abutting relation thereto and telescopically receiving the lower end of said pilot member, whereby said assembly and said upright tubular stand member can be separately demounted.

References Cited in the file of this patent
UNITED STATES PATENTS

| 113,035 | Erkson | Mar. 28, 1871 |
| 575,711 | Haley | Jan. 26, 1897 |
| 1,043,622 | Miles | Nov. 5, 1912 |
| 1,646,064 | Obermeyer | Oct. 18, 1927 |
| 1,711,587 | Brunhoff | May 7, 1929 |
| 1,748,764 | Gregorie | Feb. 25, 1930 |
| 1,799,079 | Bemis | Mar. 31, 1931 |
| 1,844,040 | Lawrenz | Feb. 9, 1932 |
| 1,897,905 | Johnson | Feb. 14, 1933 |
| 2,560,497 | Wallin | July 10, 1951 |